US006828052B2

(12) United States Patent
Zheng (10) Patent No.: US 6,828,052 B2
(45) Date of Patent: Dec. 7, 2004

(54) SURFACE TREATED ELECTRICALLY CONDUCTIVE METAL ELEMENT AND METHOD OF FORMING SAME

(75) Inventor: Xiao Guang Zheng, Mount Waverley (AU)

(73) Assignee: Ceramic Fuel Cells Limited, Victoria (AU)

(*) Notice: Subject to any disclaimer, the term of this patent is extended or adjusted under 35 U.S.C. 154(b) by 0 days.

(21) Appl. No.: 10/240,109

(22) PCT Filed: Mar. 28, 2001

(86) PCT No.: PCT/AU01/00345

§ 371 (c)(1),
(2), (4) Date: Dec. 31, 2002

(87) PCT Pub. No.: WO01/72508

PCT Pub. Date: Oct. 4, 2001

(65) Prior Publication Data

US 2003/0113577 A1 Jun. 19, 2003

(30) Foreign Application Priority Data

Mar. 28, 2000 (AU) .......................................... PQ 6537

(51) Int. Cl.$^7$ .......................... B32B 15/00; H01M 2/00
(52) U.S. Cl. ........................ 429/30; 428/672; 428/929; 428/629; 428/680; 427/115
(58) Field of Search ................................ 428/673, 680, 428/632, 929, 941, 646, 647, 648, 672, 679, 685, 629; 148/537; 427/115; 429/30, 12, 33, 247; 29/623.5

(56) References Cited

U.S. PATENT DOCUMENTS

| | | | |
|---|---|---|---|
| 3,940,319 A | | 2/1976 | Pollack |
| 4,767,508 A | * | 8/1988 | Arakida et al. ............. 205/255 |
| 5,221,859 A | | 6/1993 | Kobayashi et al. |
| 5,258,240 A | * | 11/1993 | Di Croce et al. ............. 429/31 |
| 5,326,633 A | * | 7/1994 | Clough et al. ............... 442/110 |
| 5,326,990 A | * | 7/1994 | Mita et al. .................. 257/672 |
| 5,668,060 A | * | 9/1997 | Sato et al. .................. 438/123 |
| 5,911,866 A | * | 6/1999 | Oshima et al. ............. 313/407 |
| 6,203,931 B1 | | 3/2001 | Chu et al. |
| 6,280,868 B1 | | 8/2001 | Badwal et al. |
| 6,444,340 B1 | | 9/2002 | Jaffrey |
| 6,472,094 B1 | * | 10/2002 | Nonoyama et al. ........... 429/34 |
| 6,528,181 B1 | * | 3/2003 | Yamane et al. ............. 428/626 |

FOREIGN PATENT DOCUMENTS

| | | |
|---|---|---|
| EP | 0 955 686 A1 | 11/1999 |
| EP | 1 026 768 A1 | 8/2000 |
| EP | 1029837 A2 | 8/2000 |
| JP | 02-181463 * | 7/1990 |
| JP | 11-126620 A | 11/1999 |
| SU | 651587 | 4/1994 |
| SU | 95-049713 | 4/1994 |
| TW | 387133 | 4/2000 |
| TW | 2000-663486/64 | 4/2000 |
| WO | WO 96/35825 A | 11/1996 |
| WO | WO 00/03446 A | 1/2000 |

OTHER PUBLICATIONS

Evans, Colin J., "Tin and Tin Alloy Coatings Today", Tin and Its Uses, No. 142, 1984, pp. 13–16.
Evans, Colin, J. "Tin Alloy Coatings Protect Automotive Parts", Tin and Its Uses, No. 150, 1986, pp. 4–6.
Olmedo, A. M., "A Tin Alloy as an Alternative to Gold for Electrical Contents", Tin and Its Uses, No. 122, 1979, pp. 1–2.
Evans, C.J., "Tin–Nickel Plating of Electrical Instruments", Tin and Its Uses, No. 95, 1973, pp. 12–14.
Choi, W. K. et al., Sensors and Actuators B 40 (1997), pp. 21–27.

* cited by examiner

*Primary Examiner*—John J. Zimmerman
(74) *Attorney, Agent, or Firm*—Birch, Stewart, Kolasch & Birch, LLP (57) ABSTRACT

An electrically conductive metal element comprises an electrically conductive metal substrate having a layer of Ni—Sn alloy overlying an electrically conductive surface of the substrate and at least one layer of Ag or of Ag containing Sn overlying the Ni—Sn alloy layer. The Ni—Sn alloy(s) has a Sn-content not greater than for $Ni_3Sn_2$ for high temperature uses. In a convenient method of forming the element the Sn is applied to one or more layers of Ni in a Ag+Sn mixture and diffused into the Ni layer(s) to form the Ni—Sn alloy layer and at least one layer of Ag or of Ag containing Sn. The element may have a surface layer of $SnO_2$ which can be formed by oxidizing residual Sn which migrates to the outer surface of the at least one layer of Ag containing Sn.

36 Claims, 8 Drawing Sheets

SURFACE TREATED ELECTRICALLY CONDUCTIVE METAL ELEMENT AND METHOD OF FORMING SAME

This application is the national phase under 35 U.S.C. § 371 of PCT International Application No. PCT/AU01/00345 which has an International filing date of Mar. 28, 2001, which designated the United States of America.

BACKGROUND OF THE INVENTION

1. Field of the Invention

The present invention relates to electrical conductivity in metal elements, including metal and alloy components, and is particularly concerned with metal substrates which have been treated to improve or maintain their electrical conductivity and with a method of improving the electrical conductivity of electrically conductive metal substrates in some circumstances.

2. Description of the Related Art

Many components of electrically conductive metals and alloys suffer reduced electrical conductivity over time due to the formation in adverse conditions, such as damp and/or oxidising atmospheres, of surface layers having effectively no electrical conductivity or less electrical conductivity than the substrate material. This is true of, for example, nickel, copper, mild steel and other alloys including stainless and other heat resistant steels.

The present invention has applicability to metal elements being used at low and/or elevated temperatures, but is especially useful, in at least some embodiments, for electrically conductive components in fuel cells.

In a solid oxide fuel cell the electrolyte, anode and cathode are usually ceramic or ceramic-type, such as cermet, materials. However, the surrounding components of a fuel cell stack may be of any material which can provide the desired mechanical strength, heat transfer and other properties at the temperatures necessary for operation of the fuel cell, usually in excess of 700° C. Some of these components, for example separator plates (also known as interconnect or bipolar plates), are required to provide electrical connection between adjacent fuel cells and/or elsewhere in the stack. Sophisticated electrically conductive ceramics have been developed for this purpose but these materials are expensive, mechanically fragile and are poor thermal conductors when compared with many metals and alloys which might be considered suitable.

The operating conditions in a solid oxide fuel cell are very severe on most metals, causing them to degrade via loss of mechanical strength, oxidation or other form of corrosion, distortion, erosion and/or creep. Various heat resistant metals have been developed to cope with many of these forms of degradation. Most such metals are alloys based on iron or nickel with substantial additions of chromium, silicon and/or aluminium plus, in some alloys, more expensive elements such as cobalt, molybdenum and tungsten. Chromium-based heat resistant metals are also available.

A significant feature of heat resistant alloys is the oxide layer which is formed when the alloy is exposed to mildly or strongly oxidising conditions at elevated temperatures. They all form tight, adherent, dense oxide layers which prevent further oxidation of the underlying metal. In heat resistant steel, these oxide layers are composed of chromium, aluminium or silicon oxides or some combination of them depending upon the composition of the steel. They are very effective in providing a built-in-resistance to degradation of the underlying steel in high temperature oxidising conditions.

However, while this feature is used to great advantage in many applications, the presence of the oxide layer is highly deleterious to the use of these steels in key components of solid oxide fuel cells. These oxides, especially those of silicon and aluminium, are electrically insulating at all temperatures and this is a major problem for those fuel cell components which must act as electrical current connectors or conductors. For these heat resisting steels to be useful for electrically conducting components in fuel cell assemblies, it is imperative that the insulating effect of the oxide layer be alleviated at least in selected locations.

SUMMARY OF THE INVENTION

According to the present invention there is provided an electrically conductive metal element comprising an electrically conductive metal substrate having a layer of Ni—Sn alloy overlying an electrically conductive surface of the substrate and at least one layer of Ag or of Ag containing Sn overlying the Ni—Sn alloy layer. A layer of $SnO_2$ may also be provided, overlying the at least one layer of Ag or of Ag containing Sn.

Also according to the present invention there is provided a method of improving the electrical conductivity of an electrically conductive metal substrate which forms a less electrically conductive surface oxide layer in oxidising conditions, the method comprising forming a layer of Ni—Sn alloy on at least a portion of a surface of the substrate which does not have said surface oxide layer, and forming at least one layer of Ag or of Ag containing Sn on at least a portion of the Ni—Sn alloy layer.

The invention also extends to components formed from the electrically conductive metal element. The element may be coated as defined on one or both/all sides depending upon user requirements, or only on part of one or more surfaces of the substrate.

It will be appreciated from the following that the at least one layer of Ag may contain substantial amounts of Sn. For convenience, however, hereinafter throughout this description the at least one layer of Ag or of Ag containing Sn may be referred to as the at least one layer of Ag (or equivalent— ie. Ag layer) unless at least one layer of Ag containing Sn is specifically being referred to, in which case this may be identified as Ag+Sn, Ag+Sn mixture or Ag—Sn. Ag+Sn and Ag+Sn mixture shall be understood to mean any mixture, alloy or other combination of Ag and Sn, whereas Ag—Sn shall be understood to be a reference specifically to the silver-tin alloy system.

By the present invention we have found that the Ni—Sn alloy, in addition to being a good metallic conductor, also acts as (i) a relatively stable oxygen barrier layer to restrict oxygen access to the substrate metal and (ii) a diffusion barrier to Fe, Cr, Al and other elements from the substrate. Accordingly the Ni—Sn alloy layer with the at least one overlying Ag layer can alleviate the loss of electrical conductivity of the metal element by restricting the formation of an oxide surface layer on the substrate metal and by allowing electrical conduction therethrough.

While the Ni—Sn alloy is relatively stable, it has a tendency to oxidise over time, particularly at temperatures above 300° C., and thereby gradually lose its conductivity, and the optional $SnO_2$ layer on the at least one Ag layer may be provided to slow such oxidation. The at least one Ag layer provides excellent electrical conductivity not only directly through the Ag layer(s), but also laterally through the layer(s). Thus, the electrical connection to the at least one Ag layer may be through a point contact, but the silver greatly enhances the spread of the electrical conduction laterally to the at least one Ni—Sn alloy layer, and thereby reduces the resistance to current flow to and through the metal substrate. In some embodiments the at least one Ag+Sn layer may also act as a source of Sn for the formation of the optional $SnO_2$ layer, and/or as a source of Sn for the Ni—Sn alloy layer.

The Ni—Sn alloy and Ag layers, and the optional $SnO_2$ layer, need only be provided at one or more selected locations on the metal substrate, particularly those locations where it is desired to electrically connect the metal substrate to an adjacent component or otherwise to transmit electricity to or from the metal substrate. If the metal substrate is formed of a heat resisting alloy, the remaining portion or portions of the metal substrate surface may be protected by the natural oxide layer. In other circumstances, the remaining portion(s) of the metal substrate surface may if necessary be protected by, for example, the Ni—Sn alloy alone or by some other acceptable coating.

It has previously been proposed to apply Sn—Ni mixtures to steel as a decorative, corrosion and wear resistant surface layer and as a layer that inhibits the interdiffusion of Cu and Sn and/or Pb at ambient temperatures. However, the composition of such Sn—Ni layers, as well as their structure, stability, purpose and method of formation are all substantially different from those of the Ni—Sn alloy layer which is preferred by this invention. Specifically, the above-mentioned previously proposed. Sn—Ni alloy has a composition that falls within a range which is consistent with the compound NiSn, ie. approximately 50 atomic % each of Ni and Sn. The practical limits of this composition have been established as 65 wt % Sn ±8 wt %, remainder Ni. It is a single phase compound with a hexagonal close packed structure and a high hardness. It is unstable at temperatures above 300° C. The only described method of production of this compound is through electrodeposition under specific conditions from carefully controlled solutions of salts of Ni and Sn. By comparison, the preferred Ni—Sn alloy layer of the present invention does not involve the metastable compound NiSn, is relatively stable at temperatures in the 20–850° C. range, and can be produced via a range of methods.

The layer of Ni—Sn alloy of the present invention may comprise one or more alloys from the Ni—Sn alloy system, but preferably it will not contain a phase of greater Sn content than $Ni_3Sn_2$, $Ni_3Sn_2$ comprises approximately 39 to 43 atomic % Sn (approximately 56 to 60 wt % Sn), with the residue Ni. For example, the layer of Ni—Sn alloy may contain, in order of reducing Sn content, both of $Ni_3Sn_2$ and $Ni_3Sn$, $Ni_3Sn$ alone, both of $Ni_3Sn$ and a solid solution of Sn in Ni, or a solid solution of Sn in Ni alone. Alternatively, more than two of these alloys may be present in the layer of Ni—Sn alloy.

Where two or more of these alloys are present in the layer of Ni—Sn alloy, they may be present as a mixture. However, the alloys or alloy mixtures may be present in respective sub-layers, usually with the sub-layer having the most Sn closest to the at least one layer of Ag and the sub-layer having the least Sn closest to the substrate. In one embodiment, for example, an alloy sub-layer of a solid solution of Sn in Ni may be overlaid by a sub-layer of $Ni_3Sn$.

The Ni—Sn alloy layer may be applied to the metal substrate in any suitable manner. For example, the Ni—Sn alloy layer or sub-layers may be applied directly to the metal substrate by electroplating the desired composition(s), by hot dipping in the molten alloy or alloys, by application as a slurry of the desired composition(s) and heating, or by thermally spraying the Ni—Sn alloy powder or mixtures of Ni and Sn powders of the desired composition(s).

Alternatively, the Ni—Sn alloy layer may be formed by applying enough Sn to a Ni surface or layer on the substrate and diffusing the Sn into the Ni at elevated temperature, as discussed below. In one embodiment, this may be achieved by electroplating or otherwise applying alternate, thin layers of Ni and Sn in the desired ratio of thickness and number.

The metal substrate may be any electrically conductive metal which loses electrical conductivity due to the formation of a surface layer in adverse conditions, for example nickel and nickel alloys, copper and copper alloys, mild steel, and heat resistant steels, or which it is otherwise desirable to treat in accordance with the invention. If the metal substrate is of nickel or of a nickel alloy which is nickel rich, for example an alloy having no less than 50 wt % nickel (and perhaps even no less than 40 wt % nickel) such as Monel alloy, and the Sn is not applied directly as the Ni—Sn alloy, it may not be necessary to apply a Ni layer onto the metal substrate before applying the Sn. However, in all other circumstances where the Ni and Sn are not applied together, it is necessary to apply a Ni layer onto the metal substrate. The metal substrate may already have an electrically conductive surface layer on it, providing such a surface layer does not detrimentally affect the performance of the Ni—Sn alloy and Ag layers. Such a surface layer may be of, for example, Ag.

The Ni layer or layers should have a total thickness which is sufficient to ensure that it is capable of acting effectively as a barrier layer when combined with Sn to form the desired Ni—Sn alloy(s). Nickel not consumed by the Sn to form the Ni—Sn alloy layer may diffuse into the metal substrate, particularly at elevated temperatures, depending at least primarily on the substrate material, on what, if any, surface layer is provided between the substrate and the Ni or Ni—Sn alloy layer, and on temperature. Such diffusion of Ni into the metal substrate may reduce the thickness of Ni available to form the Ni—Sn alloy, so a preferred minimum thickness for the Ni layer(s) is 10 μm. However, in some circumstances the thickness may be 5 μm or less. More preferably, the applied Ni layer(s) has a thickness of at least 20 μm.

There is no upper limit to the total thickness of the applied Ni layer(s), but the more nickel that is applied, the more Sn will be required to form the desired Ni—Sn alloy. For practical purposes, the usual maximum average thickness of the Ni layer will be 100 μm, but applying a layer of more than 50 μm thickness has been found to be unnecessary providing there is adequate coverage throughout the layer, and a more preferred maximum thickness is 40 μm. A Ni layer thickness of 30 μm has been found to provide good performance.

The thickness of the Ni—Sn layer formed by diffusion of Sn into a Ni layer may sometimes be less than that of the Ni layer from which it is formed, primarily due to diffusion of some of the nickel into the metal substrate. It has been found that a Ni layer having a thickness of about 30 μm may result, after diffusion, in an Ni—Sn alloy layer having a thickness of about 20 μm, and the preferred thickness of the Ni—Sn alloy layer(s) is in the range of 10 to 40 μm.

The Ni layer may be applied by a variety of different methods which will be known to those skilled in the art—for example, by nickel plating or thermospraying nickel powder. Thermospraying and other less controllable processes may produce a layer of considerably greater thickness, at least in parts, than described above, for example up to 300 μm or more.

Other nickel application processes include wet powder or slurry application, for example by spraying, electrophoresis and screenprinting. Where the Sn is applied separately to the Ni and there is a risk that the Ni may develop an insulating layer of NiO, the nickel may be doped with lithium before the application of the Sn to render any NiO formed semi-conducting.

Electrolytic plating of nickel may be performed in-tank or ex-tank, preferably using nickel of at least 99 wt % purity. Electroplating can produce a relatively even Ni layer which is 100% dense. Electroless nickel should not be used where the element is to be used in fuel cell applications, since it includes high levels of phosphorus which may be harmful to the operation of some fuel cells.

The substrate surface or surface portion should be free of oxide and other imperfections such as grease, and cleaning may be achieved in the electroplating process in standard manner by initially reversing the current briefly to strip off the oxide and/or other imperfections.

Enough Sn should be applied to a previously applied Ni layer(s) to form the desired Ni—Sn alloy. The composition of the Ni—Sn alloy(s) will be dependent upon a variety of factors, including the available amount of Ni on the substrate (ie. less any which has diffused into the substrate), the available amount of Sn (in particular if the Sn is applied in the at least one Ag layer as discussed below, the proportion of Sn in the Ag+Sn alloy or mixture and the applied quantity of Ag+Sn), and the treatment conditions after the Sn is applied, including the temperature and duration of the treatment. The aforementioned Ni—Sn alloy mixture and/or layered structure may be obtained by adopting the above process parameters. Similarly a layer of one alloy or alloy mixture may transform over time into a sub-layer of the original alloy or alloy mixture and a sub-layer closer to the at least one Ag layer of an alloy or alloy mixture having more or less Sn, depending on the availability of Sn outside the Ni—Sn alloy layer.

The Sn may be applied by any of a variety of different methods. In slurry or ink form, a wet powder, preferably having an average particle size of 5 to 10 μm, in a binder may be applied by spraying, for example by air brushing, tank dipping, electrophoresis, screen printing, spin coating or, for example, electrostatic spraying. Smaller particle sizes may be used, for example down to 1 μm or less, but are of no benefit since they are more expensive and may require more layers than is otherwise the case.

Alternatively, the Sn may be applied by electroplating, with suitable care to avoid the Ni layer being partially or completely stripped from the metal substrate, or for example by hot dipping in the molten metal (melting point about 232° C.). Dry powder application could alternatively be used, for example by dipping in a fluidized bed of Sn powder.

We have found that a highly advantageous method of applying the Sn to a previously applied Ni layer is in admixture or alloyed with the Ag in the at least one Ag layer and diffusing the Sn into the Ni layer(s) from the Ag+Sn mixture. The Ag+Sn mixture may be applied by any of the application methods described above for Sn alone. In the case of a powder application method, the Ag preferably has an average particle size in the range 15 to 45 μm. Once again, the Ag may have a smaller particle size, for example down to 1 μm or less, but there is no advantage since such powders are more expensive and require more layers.

The desired amount of Sn in the preferred Ag+Sn mixture will depend upon many factors, including the relative thicknesses of the Ni layer(s) and resultant Ag layer(s), the proportion of Ni which diffuses into the metal substrate, the desired composition or compositions of the Ni—Sn alloy layer, the subsequent diffusion of Sn to the surface of the at least one Ag layer and how much residual Sn, if any, is desired in the at least one Ag layer. Thus, the Ag+Sn mixture may contain up to 90 wt % or more Sn. More usually, the maximum proportion of Sn in a Ag+Sn mixture applied to the Ni layer(s) will be about 45 wt % Sn.

If an Ag+Sn mixture is applied by hot dipping in molten alloy or other high temperature process, the minimum temperature of the molten alloy will depend upon the proportion of Sn. For example, at 20 wt % Sn the temperature will need to be greater than 750° C., whereas at 10 wt % Sn the temperature will need to be greater than about 900° C. At higher proportions of Sn, the temperature may be substantially less, for example a minimum of about 630° C. at 30 wt. % Sn and about 510° C. at 45 wt. % Sn.

The Ag and/or Ag+Sn may be applied in plural layers, optionally having varying proportions of Sn therein. Where Sn is applied in the at least one layer of Ag, it may be present in all of plural layers or in only some or one.

Ag or Ag+Sn layers having a thickness in the range of 10 to 20 μm are sometimes difficult to apply as a continuous layer, so a more preferred minimum thickness is 20 μm. Ag or Ag+Sn layers having a thickness greater than 100 μm may be applied, but such amounts of silver are unnecessary to provide its advantages. In our early investigations Ag layers having thicknesses in the range 70 to 80 μm were provided, but this amount has been found to be unnecessary. For applications requiring durability over long periods of time, for example several years or more, a maximum thickness of 50 μm for the Ag or Ag+Sn layer(s) may be preferred. For shorter terms a maximum thickness of 30 μm may be preferred.

As briefly described above, when the Sn is applied separately from the nickel, the Sn is diffused into the nickel at elevated temperature to form the Ni—Sn alloy. The temperature of the diffusion process will depend upon the purity of the Sn. If the Sn is applied to the Ni layer separately from the Ag layer(s), diffusion may occur at a relatively low temperature, for example at or above the melting temperature of the Sn or possibly at a lower temperature. If the Sn is applied by hot dipping in molten metal, a separate diffusion process may not be required. Likewise, if the Sn is applied by hot dipping in a molten Ag—Sn alloy, a separate diffusion process may not be required provided the temperature has been maintained at the elevated level for a sufficient period of time.

If a separate diffusion process is required following the application of the Ag+Sn layer(s), this is preferably performed at a temperature in the range of 750° C. to up to 1000° C. or more, more preferably in the range 800 to 980° C., and most preferably at a temperature in the range 800 to 900° C. At temperatures below 750° C. the diffusion process may be too slow, and temperatures above about 1000° C. are unnecessary since they are well above the liquidus of the composition and may cause damage to at least the substrate.

A separate diffusion process is preferably performed for each of plural Ag+Sn layers applied, at a temperature dependent upon the composition of the particular Ag+Sn mixture. It is believed that the diffusion process is best performed at above the liquidus temperature of the Ag+Sn mixture, but this may not be essential. If diffusion of the Sn from Ag+Sn mixture is performed at above the liquids temperature, a Ag—Sn alloy will form.

The length of the diffusion process is dependent upon the diffusion temperature as well as the composition, but for a Ag+Sn composition having more than 10 wt % Sn, the diffusion process at 900° C. is preferably carried out for a period of from about 30 to about 60 minutes. At temperatures above the liquidus, the diffusion process may also have the advantage of densifying the Ag layer and thereby providing greater resistance to the penetration of oxygen through that layer.

The atmosphere of the diffusion process is preferably inert or reducing. Pure Ar has been found a satisfactory diffusing atmosphere, and pure nitrogen may be. The diffusing atmosphere advantageously excludes oxidising components such as $CO_2$, Cl and other halides, but commercially pure inert or reducing atmospheres have been found to be satisfactory. Most preferably, the diffusing atmosphere is mildly reducing, for example 5 wt % $H_2$ in nitrogen or argon.

The elevated temperature is required for the Ni—Sn alloy layer(s) to form by diffusion of the Sn into the nickel, but it is important to avoid oxidising the layer(s) before the Ni—Sn alloy is fully formed. Subject to this, the diffusion process could be performed in a controlled oxidising atmosphere.

The overall thickness of the Ag or Ag+Sn layer(s) on the element of the invention is preferably in the range 10 to 100 $\mu$m. One of the further advantages in the invention of providing at least one Ag layer on the Ni—Sn alloy layer is its compliance and therefore the good physical contact that it can give to a contiguous component. At thicknesses less than 10 $\mu$m, it is found that this compliance of the Ag layer(s) may not be present and/or that there may be inadequate coverage by the Ag layer(s) of the Ni—Sn alloy. However, entire coverage of the Ni—Sn alloy layer may not be necessary depending upon the use of the electrically conductive metal element, since the primary function of the at least one Ag layer is to provide lateral as well as direct electrical connection through the layer.

Potential disadvantages of having an Ag surface layer on an element according to the invention at elevated temperature are firstly that the Ag tends to evaporate and secondly that oxygen may be able to diffuse through the or each Ag layer and oxidise the Ni—Sn alloy layer. Evaporation of the Ag may cause substantial disadvantages, particularly in fuel cell applications of the electrically conductive metal element.

Advantageously, after the diffusion process the at least one Ag layer contains residual Sn, preferably in the range about 3 to 30 wt % Sn, more preferably about 5 to 20 wt %, and even more preferably about 6 to 15 wt %. Some residual Sn may remain in the Ag layer or layers without detrimental effect on the performance of the electrically conductive metal element. If there is any residual Sn in the Ag layer(s) after the aforementioned diffusion process, or Sn is otherwise not consumed by the Ni—Sn alloy, at least some will migrate through the Ag at elevated temperature in an oxidising atmosphere to form the aforementioned optional $SnO_2$ surface layer. Preferably the at least one Ag layer contains at least 6 wt % of residual Sn after the diffusion treatment to form a stable, continuous oxygen barrier layer of $SnO_2$. Alternatively, Sn or $SnO_2$ could be applied to the at least one Ag layer as a separate layer. The $SnO_2$ surface layer may provide a very effective vapour barrier of refractory material on the surface of the Ag layer(s), alleviating the risks of both the evaporation of Ag and the transmission of oxygen therethrough. In addition to alleviating the oxidation of the Ni—Sn alloy layer(s), this has the advantage of allowing a thinner Ag layer(s) to be applied since no compensation is required for evaporation of the Ag at elevated temperature.

As noted above, to advantageously cause the $SnO_2$ layer to be formed automatically when the metal element in accordance with the invention is disposed in an oxidising atmosphere at elevated temperature, it is only necessary to provide residual Sn in the at least one Ag layer. Alternatively, excess Sn may be provided on the aforementioned Ni layer(s) or in the Ni—Sn alloy layer. In one embodiment at least two Ag+Sn layers are applied successively, with a separate diffusion process associated with each. In the diffusion process associated with the first Ag+Sn layer, most or all of the Sn will migrate into the Ni layer. In the diffusion process associated with a second or further Ag+Sn layer, further Sn may diffuse through the first Ag layer and consume excess Ni in the Ni—Sn alloy layer, leaving residual Sn in the second or further and first Ag layers. In a subsequent oxidising treatment, at least some of the residual Sn migrates to the surface of the second or further Ag layer and reacts to form $SnO_2$.

Preferably the Sn is not wholly consumed ill the Ni—Sn alloy and in the $SnO_2$ surface layer, thereby leaving a small reservoir should the $SnO_2$ layer need to be replenished or repaired at a later time. In an oxidising atmosphere, $SnO_2$ will continue to grow on the outer surface of the at least one Ag layer provided there is available Sn migrating to the surface. However, the rate of growth will decrease as the thickness of the $SnO_2$ layer increases. Possibly, over time in an oxidising atmosphere, Sn will be drawn from the Ni—Sn alloy layer to replace Sn in the at least one Ag layer used to form or maintain the $SnO_2$ layer. Thus, for example, if the Ni—Sn alloy layer comprises $Ni_3Sn$ or a mixture of $Ni_3Sn$ and a solid solution of Sn in Ni, for example in sub-layers, Sn may be drawn from the $Ni_3Sn$ to the extent that the $Ni_3Sn$ transforms into the lower-Sn content solid solution of Sn in Ni.

The $SnO_2$ layer preferably has a thickness in the range of about 2 to 20 $\mu$m, more preferably less than 10 $\mu$m. The layer may be as thin as possible but should be continuous over the Ag layer, except where direct electrical contact with the Ag layer is required, to alleviate evaporation of the Ag at elevated temperature.

Treatment of the metal element in an oxidising atmosphere to form the $SnO_2$ may be carried out at an elevated temperature, such as about 650° C. or more. At 750° C., the desired thickness of $SnO_2$ may take several hours, for example about 10 hours, to form, but at 900° C. this may be reduced to about 30 minutes. The oxidising may be performed in any $O_2$-providing atmosphere, and for fuel cell applications of the element it may be performed in the fuel cell stack or otherwise in use. The $SnO_2$ layer may also protect a metal element in accordance with the invention against carburizing atmospheres and wet and mildly reducing wet atmospheres, and this may have advantage in non-fuel cell and/or low temperature applications.

A potential disadvantage of the $SnO_2$ being formed over the Ag layer(s) is that $SnO_2$ is a semi-conductor. However, where high electrical conductivity is required through the $SnO_2$ layer, the $SnO_2$ may be doped with Sb oxide or other suitable oxides or elements, eg. $As_2O_3$, $P_2O_5$, F or Cl. The Sb or other oxide dopant is preferably added at a level to 1 to 2 atomic % of the $SnO_2$ at the selected location or locations. The Sb oxide may be added as the metal or as the oxide, preferably in powder form, when the Sn is applied as powder (eg. in a slurry). The Sb metal goes into solid solution in the $SnO_2$ as $Sb_2O_5$ or $Sb_2O_4$, and excess Sb additions may be lost as metallic or oxide vapour. The dopant or dopants, or precursors of them, may conveniently be included in the Ag+Sn mixture if the Sn is provided by way of a surface layer of Ag.

An advantage of an electrically conductive metal element in accordance with the invention is that the various layers, including a heat resistant nickel or steel substrate with the at least one silver layer are compliant. This means that the likelihood of the layers peeling off during thermal cycling is reduced.

BRIEF DESCRIPTION OF THE DRAWINGS

Various embodiments of electrically conductive metal elements in accordance with the present invention, and methods of forming them, will now be described in a non-limiting manner with reference to the following examples and the accompanying drawings, in which:

FIG. 7 is a graph similar to FIG. 1 but for ninth and tenth samples in accordance with the invention; and an oxidising atmosphere, the Ni—Sn alloy layer comprised a solid solution of Sn in Ni. Prior to this, in some cases there may have been a sub-layer of $Ni_3Sn$ between a sub-layer of the solid solution of Sn in Ni and the at least one Ag layer. The treated specimens were placed in a contact resistance test rig to measure the voltage drop across each specimen, which is a measure of the total resistance of the coated surface to a current of 1 amp/cm$^2$ as a function of time at 750° C., in air. The voltage drop over time should be as low and as constant as possible and preferably no more than about 10 mV.

In all of the Figures, the voltage drop is less than 10 mV and is generally stable. Initial changes in the contact resistance are generally due to a gradual improvement of test rig contacts. A slow increase in the contact resistance is due to a slight rise in the resistivity of the treated surfaces at their points of contact. The contact load on the sample surfaces was 100 gcm$^{-2}$.

In the Figures, it may be seen that some of the samples were subjected to thermal cycling, usually between 750° C. and 20 or 50° C., but there was no increase in the contact resistance resulting from the thermal cycling once the temperature was restored to 750° C. The lowermost curve in each Figure represents temperature while the upper curve(s) represents the voltage drop.

TABLE 1

| Sample No. | Subst-rate | Ni Layer Thickness | 1st Silver Layer Thickness | 1st Silver Layer Composition | 1st Heat Treatment Temp C.° | 1st Heat Treatment Time | 1st Heat Treatment Atmosphere | 2nd Silver Layer Thickness | 2nd Silver Layer Composition | 2nd Heat Treatment Temp C.° | 2nd Heat Treatment Time | 2nd Heat Treatment Atmosphere |
|---|---|---|---|---|---|---|---|---|---|---|---|---|
| 1 | NCA-S | 20 μm | 200 μm | 6% Sn in Ag (noSb) | 960 | 1 hr | Ar | | | | | |
| 2 | Kanthal-A | 20 μm | 180 μm | 6% Sn in Ag | 970 | 1 hr | 5% H$_2$ in Ar | | | | | |
| 3 | NCA-S | 40 μm | 65 μm | 8% Sn, 0.5% Sb$_2$O$_3$ in Ag | 930 | 1 hr | 5% H$_2$ in Ar | | | | | |
| 4 | NCA-S | 40 μm | 80 μm | 10% Sn, 0.5% Sb$_2$O$_3$ in Ag | 920 | 1 hr | 5% H$_2$ in Ar | | | | | |
| 5 | NCA-S | 20 μm | 50 μm | 10% Sn in Ag | 920 | 1 hr | 5% H$_2$ in Ar | 10 μm | 22% Sn, 1% Sb$_2$O$_3$ in Ag | 750 | 1 hr | 5% H$_2$ in Ar |
| 6 | NCA-S | 40 μm | 40 μm | 10% Sn in Ag | 920 | 1 hr | 5% H$_2$ in Ar | 10 μm | 22% Sn, 1% Sb$_2$O$_3$ in Ag | 750 | 1 hr | 5% H$_2$ in Ar |
| 7 | NCA-S | 40 μm | 40 μm | 10% Sn in Ag | 920 | 1 hr | 5% H$_2$ in Ar | 20 μm | 22% Sn, 1% Sb$_2$O$_3$ in Ag | 750 | 1 hr | 5% H$_2$ in Ar |
| 8 | NCA-S | 20 μm | 80 μm | 10% Sn in Ag | 920 | 1 hr | 5% H$_2$ in Ar | 20 μm | 22% Sn, 1% Sb in Ag | 750 | 1 hr | 5% H$_2$ in Ar |
| 9 | NCA-S | 40 μm | 30 μm | 15% Sn&0.4% Sb in Ag | 850 | 1 hr | 5% H$_2$ in Ar | 5 μm | 20% Sn, 0.5% Sb in Ag | 770 | 1 hr | 5% H$_2$ in Ar |
| 10 | NCA-S | 20 μm | 30 μm | 15% Sn&0.4% Sb in Ag | 900 | 1 hr | 5% H$_2$ in Ar | 5 μm | 20% Sn, 0.5% Sb in Ag | 770 | 1 hr | 5% H$_2$ in Ar |
| 11 | NCA-S | 40 μm | 30 μm | 15% Sn&0.4% Sb in Ag | 900 | 1 hr | 5% H$_2$ in Ar | 5 μm | 20% Sn, 0.5% Sb in Ag | 770 | 1 hr | 5% H$_2$ in Ar |

DETAILED DESCRIPTION

FIGS. 1 to 8 were obtained by, for each sample, treating one of the two major surfaces of a specimen made from a self-aluminising steel, that is a stainless steel having 5 wt % or more aluminium, as set out in Table 1, to form an electrically conductive metal element in accordance with the invention. In all cases, at least after several hundred hours in

SAMPLE 1

Referring to Table 1, the substrate material NCA-S of Sample 1 was a self-aluminising grade of steel produced by Nisshin Steel Co. Ltd. The substrate had a Ni layer of 20 μm thickness applied to a major face by electroplating using nickel of 99+wt % purity. The electroplating process included a preliminary surface cleaning process in which oxide and/or other impurities were stripped from the substrate surfaces.

A 200 μm layer of Ag containing 6 wt % Sn was applied to the Ni layer by a generally known process. The Ag+Sn mixture was applied as a slurry of powders in an organic lacquer binder. The average particle sizes of the Sn and Ag were about 5 μm and 35 μm, respectively. The slurry was sprayed onto the Ni layer.

The coated substrate was then subjected to a diffusion process by heating at 960° C. for 1 hour in argon. During this process some of the nickel in the Ni layer diffused into the substrate metal, and the remainder of the nickel in the Ni layer was consumed by the Sn diffusing from the Ag—Sn alloy layer to form a layer of Ni—Sn alloy. There was insufficient Sn in the Ag—Sn alloy layer following the diffusion treatment, to form a complete $SnO_2$ layer on the surface of the Ag layer in the oxidising atmosphere at elevated temperature of the contact resistance test.

Figure 1:
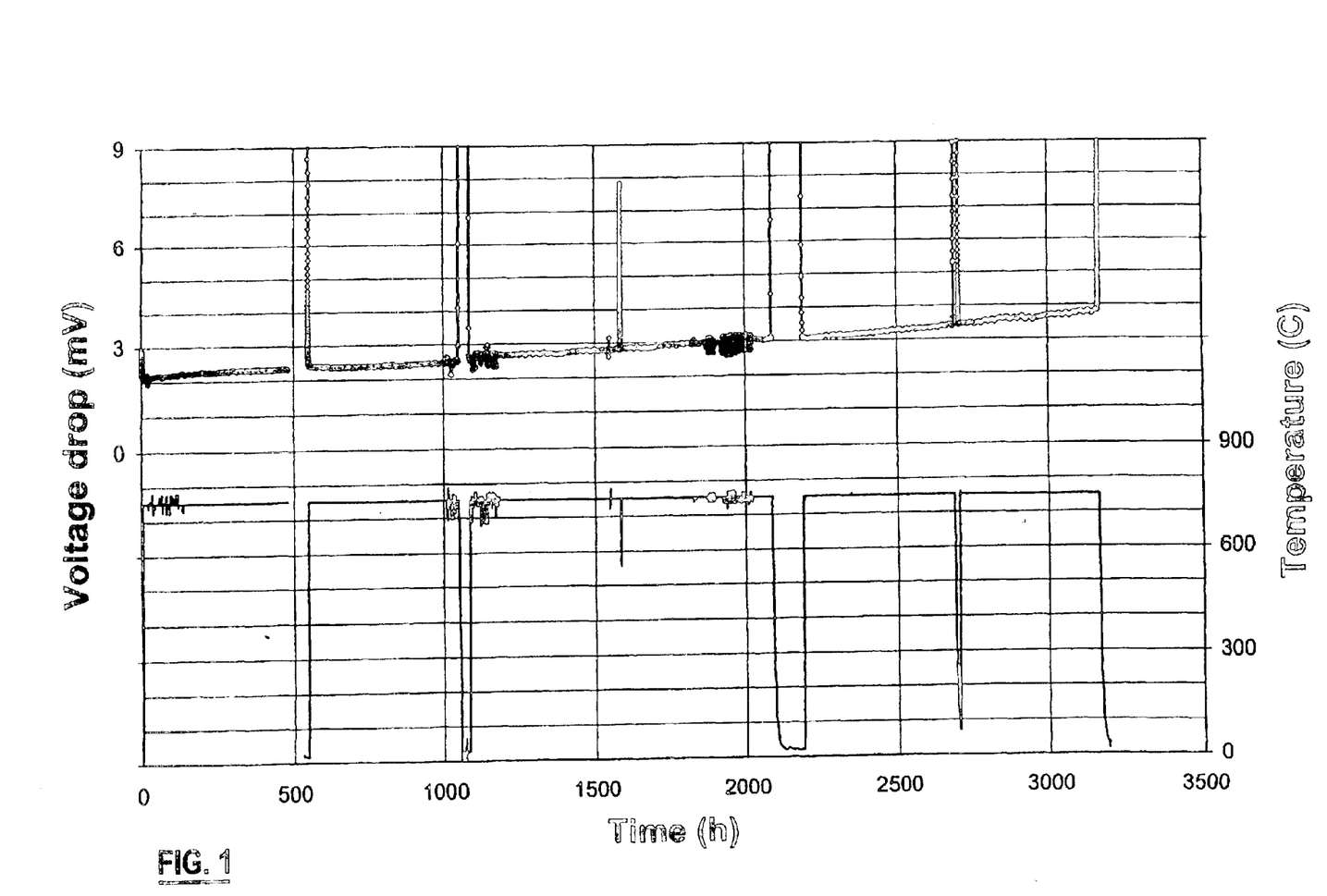
FIG. 1 is a graph showing the change in contact resistance as a function of time and temperature of a first sample in accordance with the present invention.

As may be seen from FIG. 1, the increase in the voltage drop over about 3,200 hours was about 2 mV. The rapid increase in contact resistance during each temperature drop shows that oxygen from the oxidising atmosphere has at least partly oxidised the Ni—Sn alloy layer. The, use of a lithium dopant may allow the oxidised layer to continue to conduct electricity as a semiconductor.

SAMPLE 2

This sample was prepared in the same manner as Sample 1 except for the following variations. The heat resistant metal substrate was Kanthal-A self-aluminising steel, supplied by Sandvik, which had been surface coated with a silver layer 10 to 20 μm thick. This was an artefact of other work and is not believed to have affected the performance of the Sample. The Ni layer was electroplated directly onto the clean silver layer. The thickness of the subsequent Ag—Sn alloy layer was 180 μm and the diffusion process was carried out at 970° C. in a mildly reducing atmosphere of 5% hydrogen in argon.

As with Sample 1, there was insufficient residual Sn in the Ag, after diffusion of the Sn into the Ni layer to form the Ni—Sn alloy, to form a complete surface $SnO_2$ layer in the oxidising atmosphere of the contact resistance test. The Ni—Sn alloy was doped with lithium to ensure continued semi-conductivity of any NiO layer resulting from the passage of oxygen from the oxidising atmosphere through the Ag to the Ni—Sn alloy at the elevated temperature of the contact resistance test.

Figure 2:
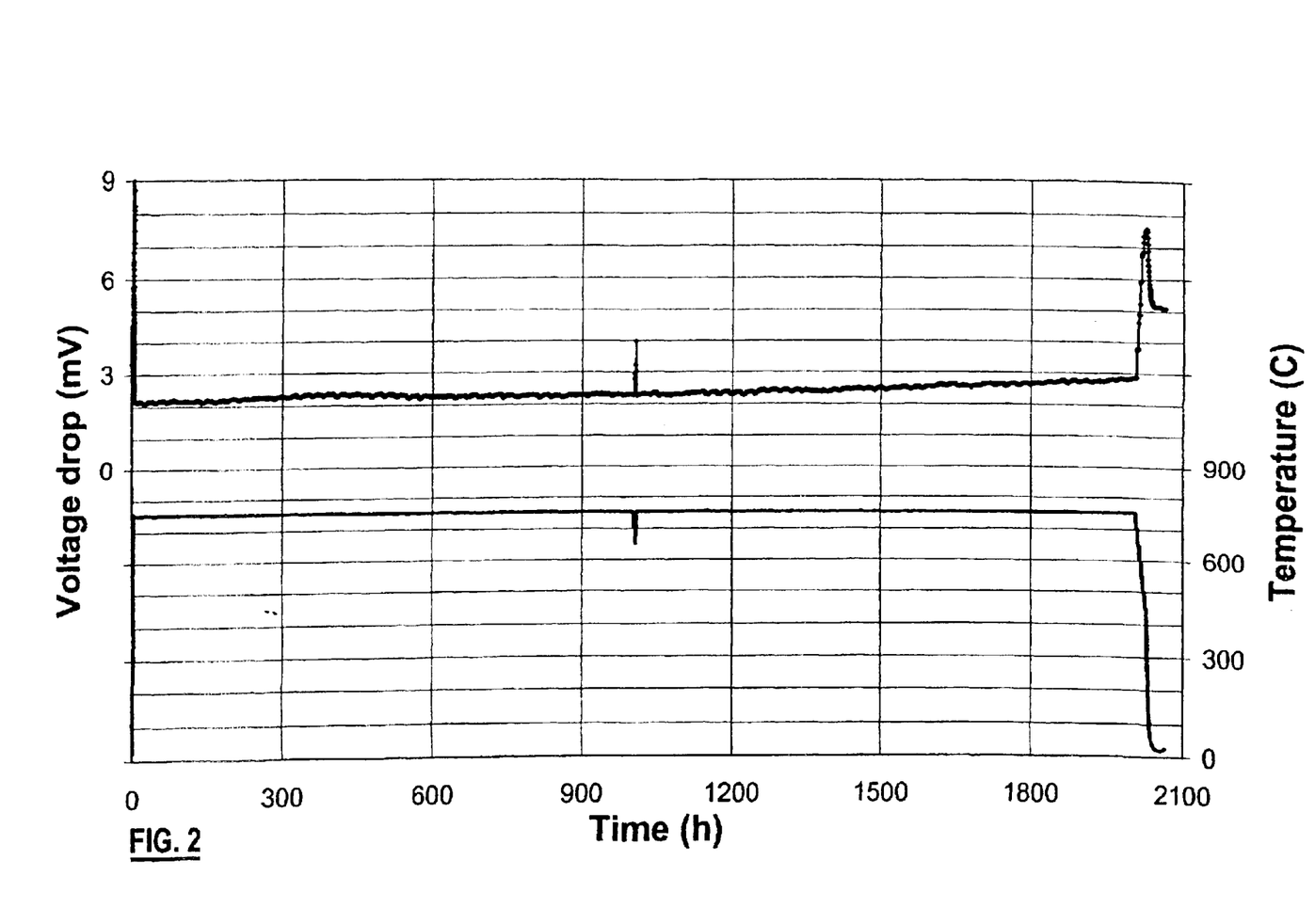
FIG. 2 is a graph similar to FIG. 1 but for a second sample in accordance with the invention.
Figure 3:
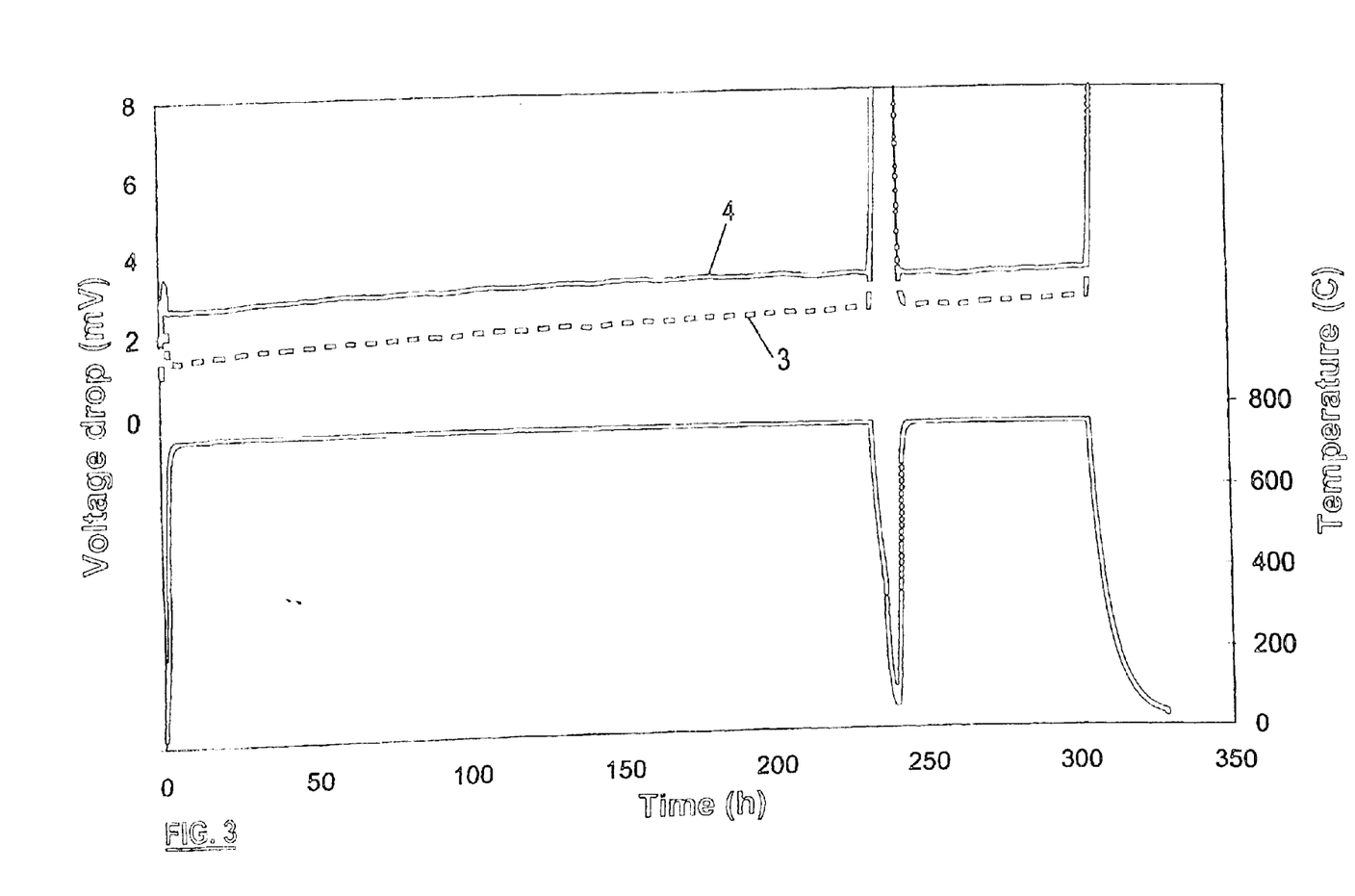
FIG. 3 is a graph similar to FIG. 1 but for third and fourth samples in accordance with the invention.
Figure 4:
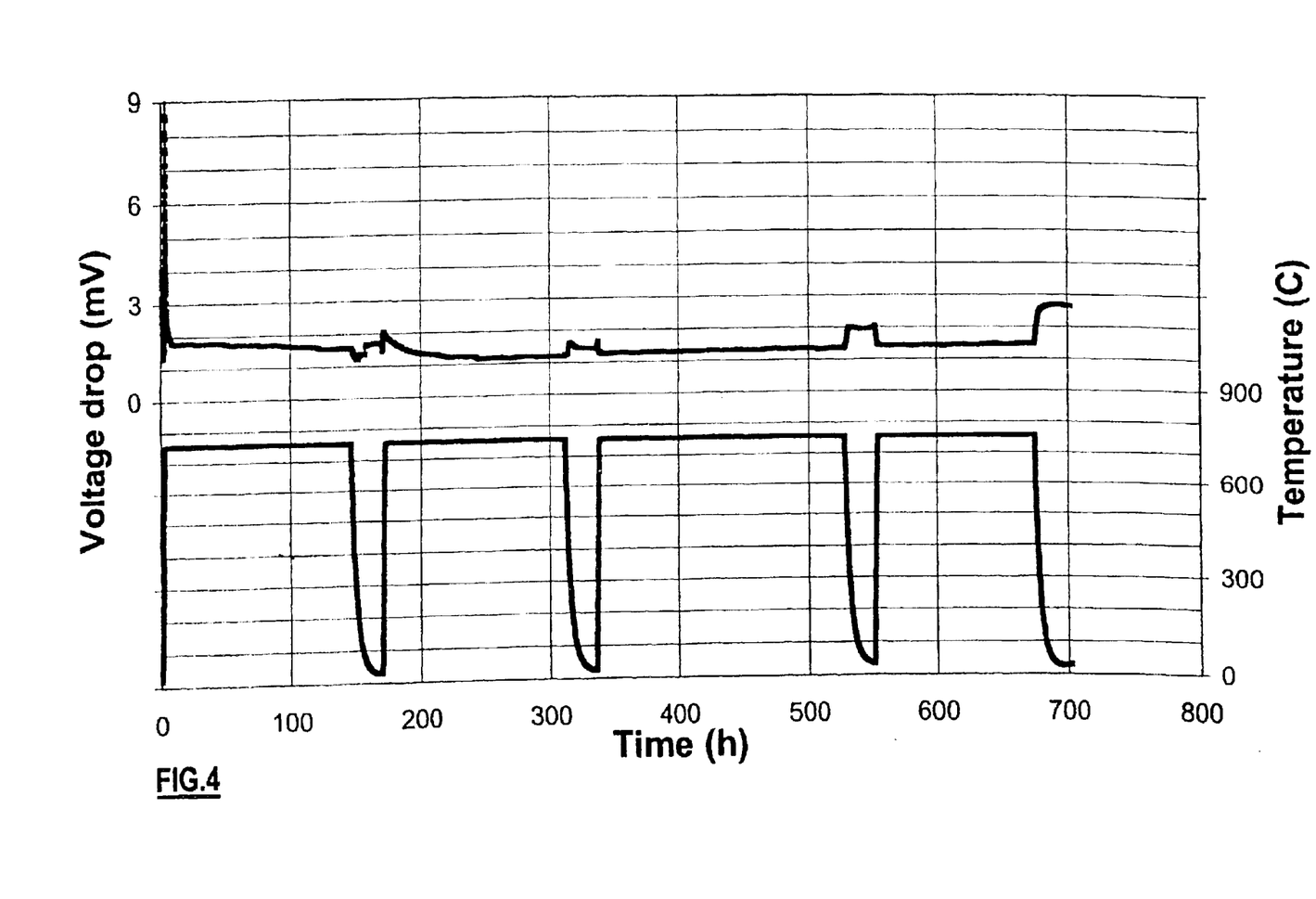
FIG. 4 is a graph similar to FIG. 1 but for a fifth sample in accordance with the invention.

Notwithstanding the possible oxidising of the Ni—Sn alloy layer, the voltage drop over about 2,000 hours was only about 1 mV, as seen from FIG. 2.

SAMPLE 3

This Sample was prepared as described with reference to Sample 1, except that the Ni layer had a thickness of 40 μm, the Ag—Sn alloy layer had a thickness of 65 μm and contained 0.5 wt % $Sb_2O_3$ in addition to 8 wt % Sn, and the diffusion process was conducted at 930° C. for 1 hour in a mildly reducing atmosphere of argon containing 5 wt % $H_2$.

Once again, there was insufficient Sn present in the Ag/Sn layer to form an $SnO_2$ surface layer in the oxidising atmosphere of the contact resistance test, leading to the oxidation of the Ni—Sn alloy layer. The voltage drop increased by over 1 mV during the 300 hours of the test.

SAMPLE 4

Sample 4 was a modification of Sample 3, with the Ag—Sn alloy layer containing 10 wt % Sn and having a thickness of 80 μm, and the diffusion process being conducted at 920° C.

As with Sample 3, no $SnO_2$ layer was formed, leading to oxidation of the Ni—Sn alloy layer and a gradual increase in contact resistance, as measured by a voltage drop, of slightly less than 1 mV over the 300 hours of the test.

SAMPLE 5

Sample 5 is a major variation of Sample 4 in which the Ni layer has a thickness of only 20 μm and a first Ag—Sn alloy layer is identical except that it contains no $Sb_2O_3$ and has a thickness of 50 μm. Additionally, a second Ag+Sn mixture layer was applied after the first diffusion process. The second Ag—Sn alloy layer contained 1 wt % $Sb_2O_3$ in addition to 22 wt % Sn and had a thickness of 10 μm. The second Ag—Sn alloy layer was subjected to a diffusion process at 750° C. for 1 hour in a mildly reducing atmosphere of argon containing 5 wt % $H_2$.

In the oxidising atmosphere of the content resistance test, this structure produced an $SnO_2$ layer having a thickness of about 1.5 to 3.0 μm over the second Ag layer, doped with Sb to maintain electrical conductivity through the $SnO_2$. The $SnO_2$ layer prevents evaporation of the Ag and access of oxygen from the oxidising atmosphere of the contact resistance test so that oxidation of the Ni—Sn alloy is alleviated. This structure produced good voltage drop characteristics, as seen from FIG. 4, with no voltage drop during the 670 hours of the test and a negligible increase in voltage drop during temperature cycling.

SAMPLES 6 AND 7

Sample 6 was identical to Sample 5 except that the Ni layer and the first Ag—Sn alloy layer both had thicknesses of 40 μm. Sample 7 was identical to Sample 6 except that the second Ag—Sn alloy layer had a thickness of 20 μm. It will be appreciated from this that Sample 7 had twice as much Sn in the second Ag—Sn alloy layer available to form the $SnO_2$ layer doped with antimony.

Figure 5:
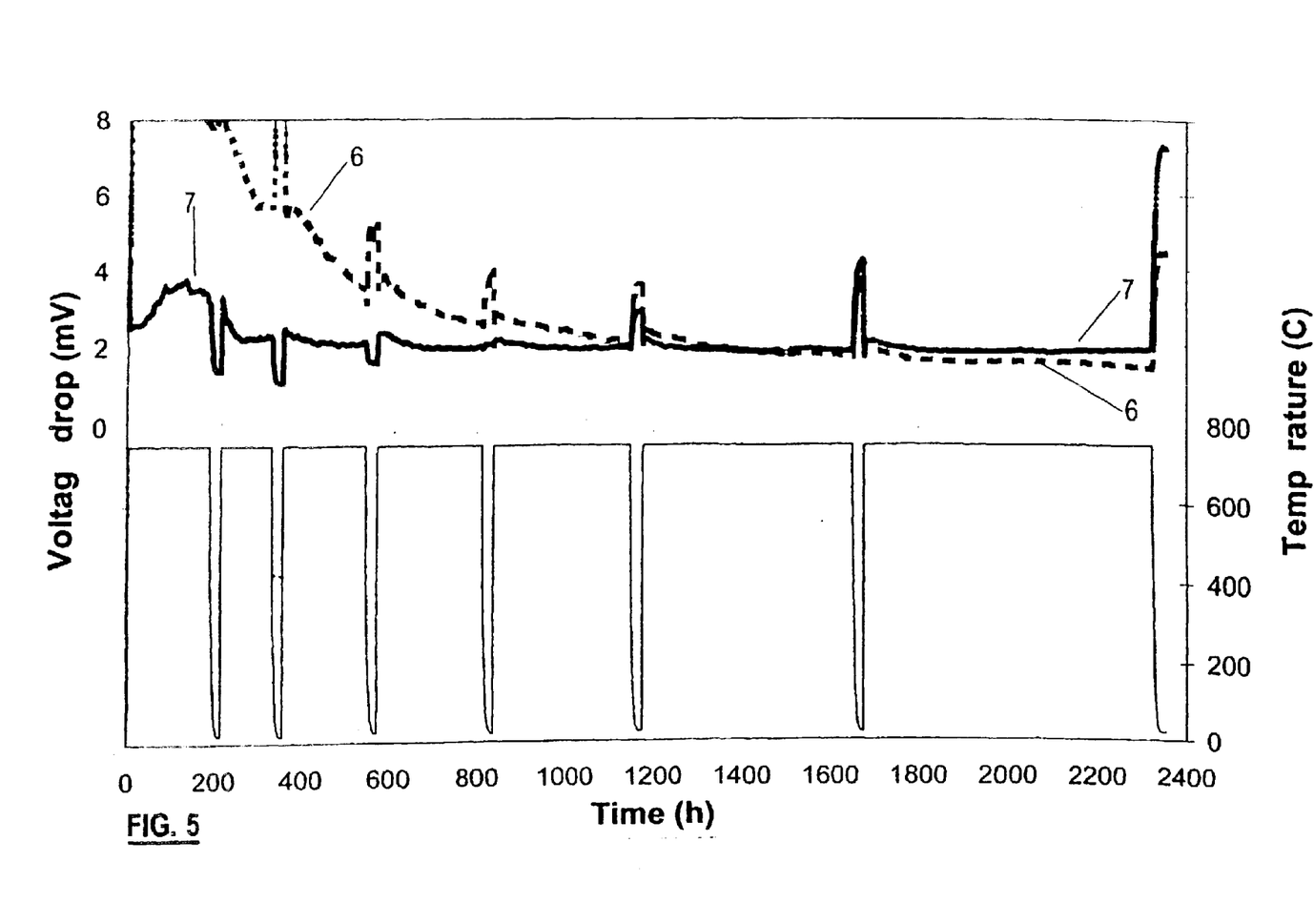
FIG. 5 is a graph similar to FIG. 1 but for sixth and seventh samples in accordance with the invention.
Figure 6:
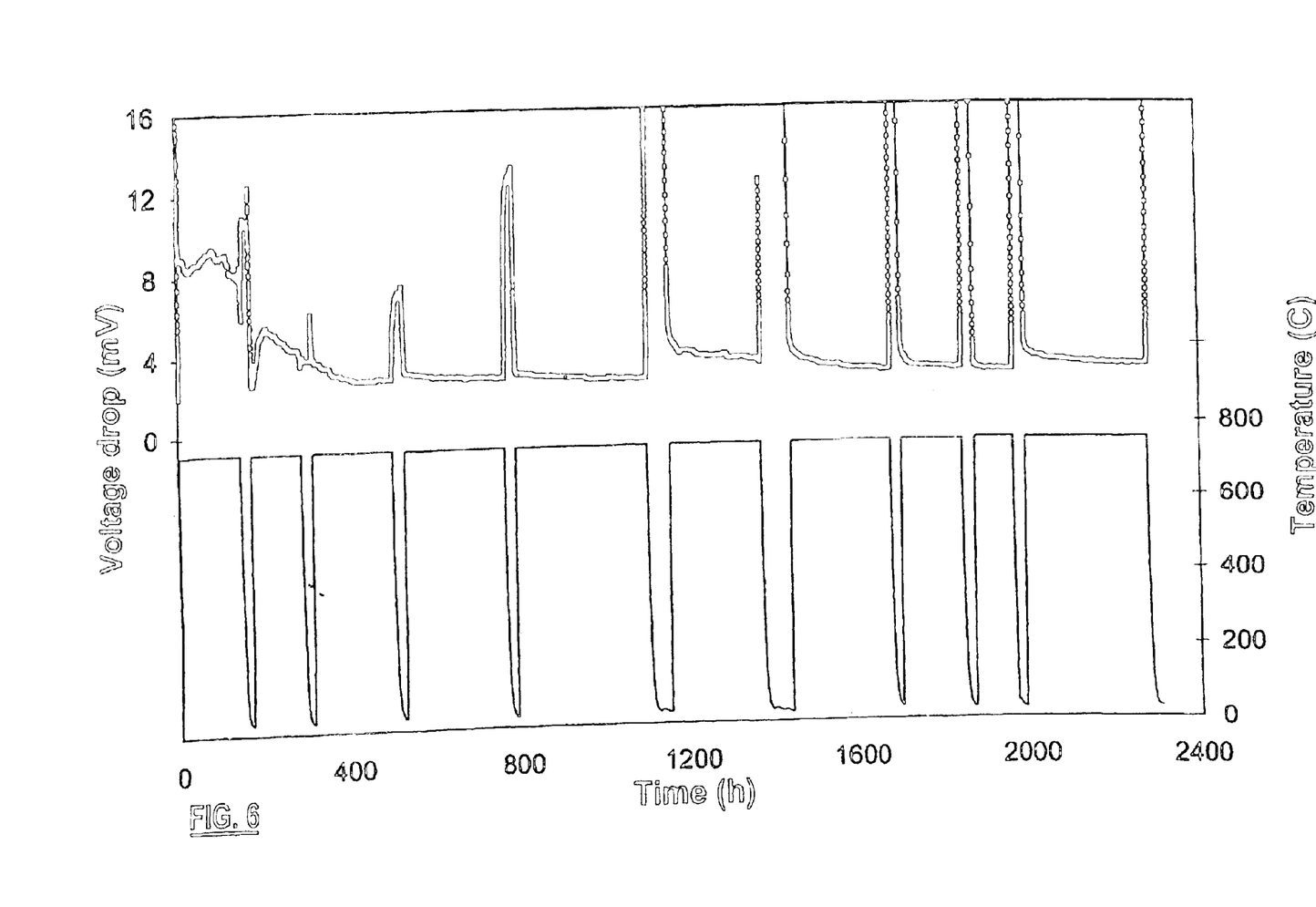
FIG. 6 is a graph similar to FIG. 1 but for an eighth sample in accordance with the invention.

Both samples were subjected to the contact resistance test in the same furnace and the plots are shown in FIG. 5. It may be seen that once the voltage drop characteristics had settled down after the first 200 hours, the voltage drop of the Sample 7 remained relatively steady over the next 2200 hours. Sample 6 took longer to settle down, but the voltage drop continued to decline over the 2400 hours of the test. Interestingly, Sample 7 maintained metallic conduction properties during the first 3 temperature drops, but then converted to semiconductor properties, while Sample 6 maintained semi conductor properties throughout the test. Metallic conductivity is preferred for good electrical connections in fuel cell assemblies. Semiconductor properties are acceptable for constant high temperature operation of a fuel cell assembly but are undesirable in fuel cell assemblies being subjected to temperature cycles often during their life.

SAMPLE 8

Sample 8 is identical to Sample 7 except that the Ni layer had a thickness of 20 μm, the first Ag—Sn alloy layer had a thickness of 80 μm and the dopant addition to the second Ag/Sn layer was 1 wt % Sb metal instead of $Sb_2O_3$.

This combination produced semi-conductor properties throughout the 2400 hours of the test, but, with a negligible voltage drop.

SAMPLES 9 TO 11

Samples 9 to 11 are similar to Sample 8, but differ in the following characteristics. Samples 9 and 11 have a nickel layer thickness of 40 μm; the first Ag—Sn alloy layer in each has a thickness of 30 μm and a composition of 15 wt % Sn and 0.4 wt % Sb metal in the Ag; the first diffusion treatment was conducted at 850° C. for Sample 9 and at 900° C. for Samples 10 and 11; the second Ag—Sn alloy layer for each had a thickness of only 5 μm and a composition of 20 wt % Sn and 0.5 wt % Sb metal in the Ag; and the second diffusion treatment was conducted at 770° C. for all three samples.

Figure 7:
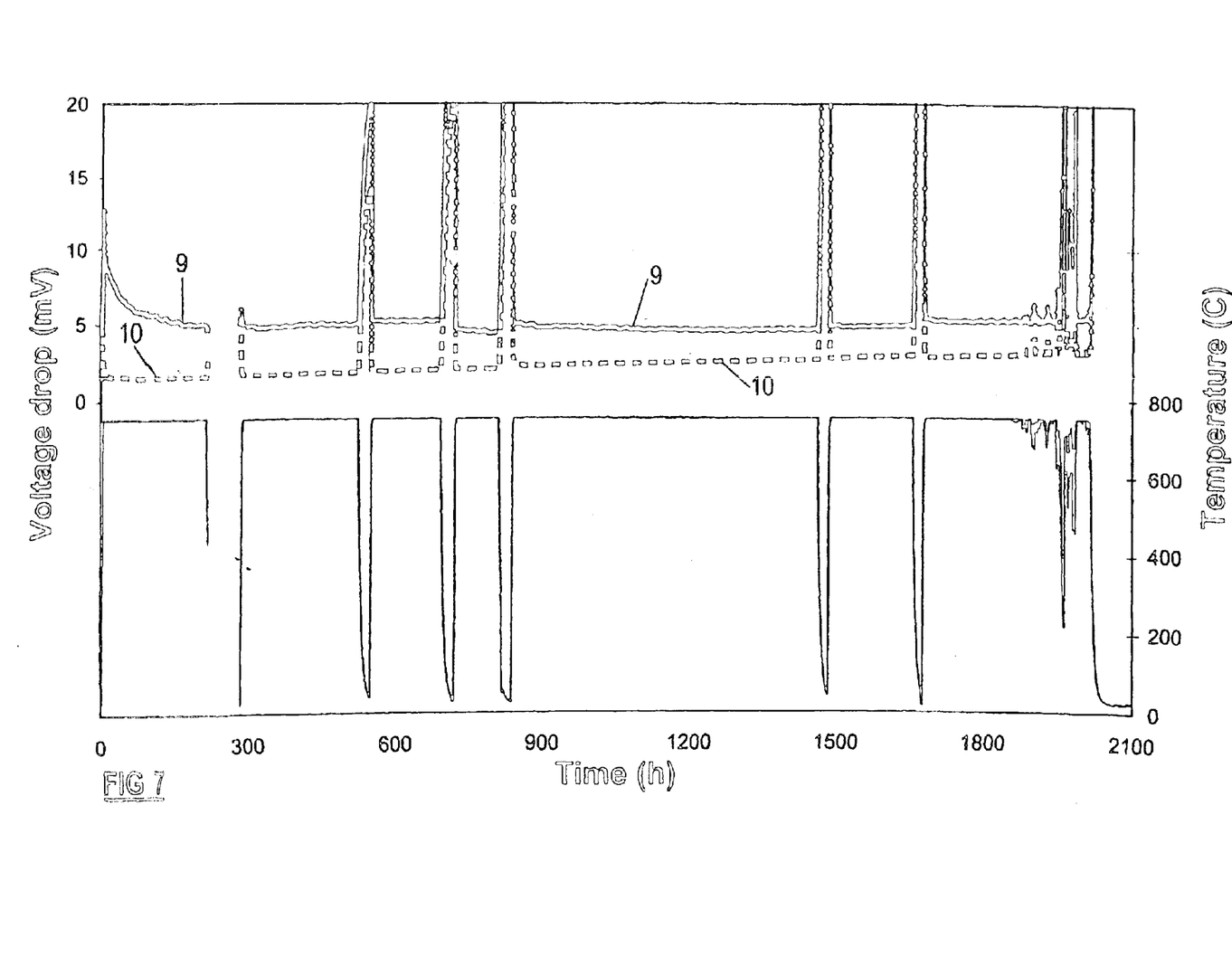
Figure 8:
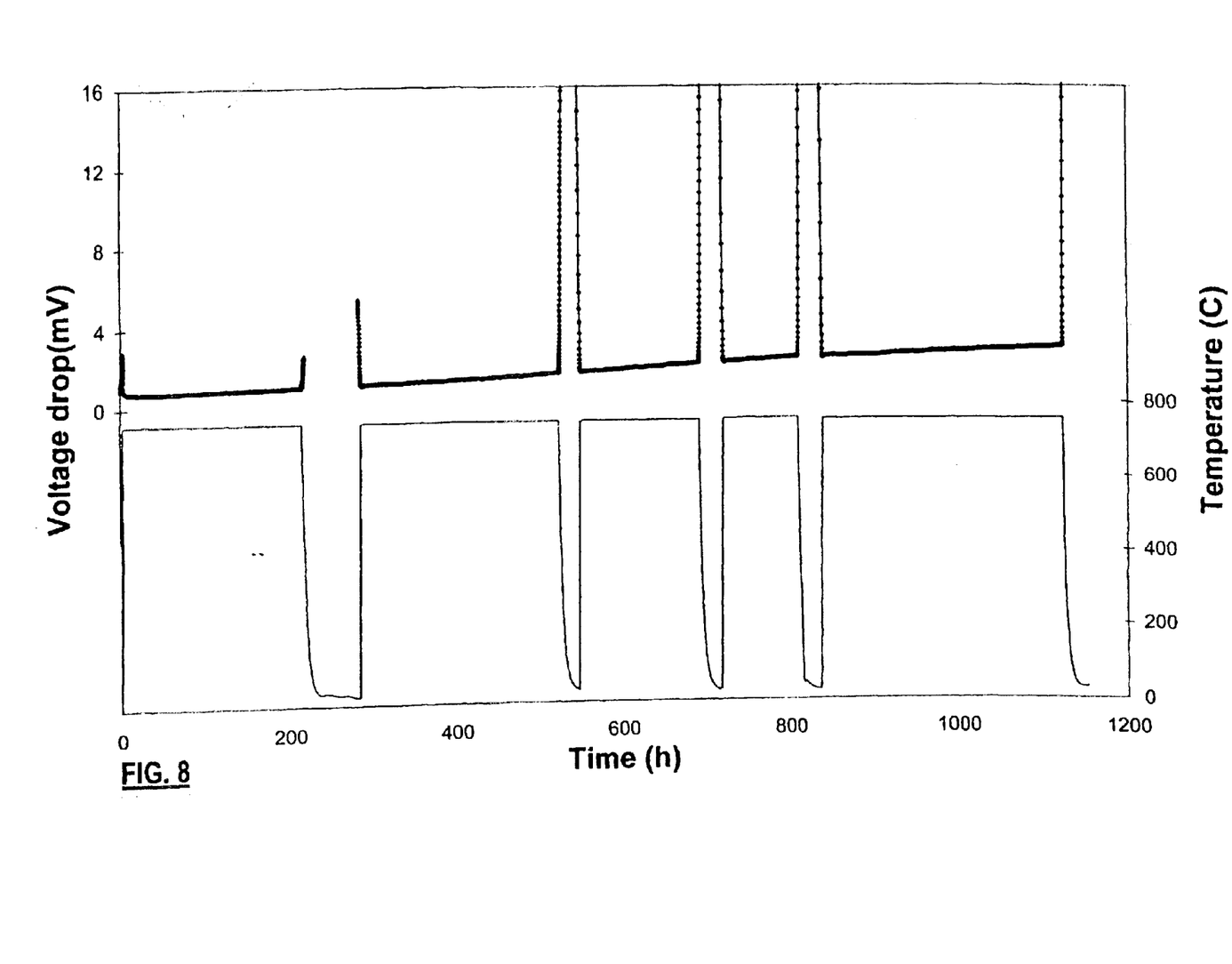
FIG. 8 is a graph similar to FIG. 1 but for an eleventh sample in accordance with the invention.

Samples 9 and 10 were subjected to the contact resistance test in the same furnace, while Sample 11 was tested separately, as may be seen from FIGS. 7 and 8, respectively. Nevertheless, all three samples may be compared. The discontinuity just after 200 hours in FIGS. 7 and 8 was due to a site power failure. The irregular readings after 1800 hours in FIG. 7 were due to a temperature control failure.

It will be appreciated from the above that a variety of different compositions and structures are available to provide a product in accordance with the invention. Furthermore, it will be appreciated that different structures may be adopted for different end uses, particularly depending upon the temperature of use. For high temperature use in fuel cell applications, it is preferred that the at least one Ag layer is overcoated with an $SnO_2$ layer, optionally doped with Sb, in order to prevent evaporation of the Ag and to provide enhanced resistance at elevated temperature to oxidation of the Ni—Sn alloy layer. Such properties may not be necessary for low temperature work.

Those skilled in the art will appreciate that the invention described herein is susceptible to variations and modifications other than those specifically described. It is to be understood that the invention includes all such variations and modifications which fall within its spirit and scope.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge in Australia or elsewhere.

What is claimed is:

1. A component of a solid oxide fuel cell assembly, said component being electrically conductive at temperatures in excess of 700° C. and comprising an electrically conductive metal substrate of heat resisting alloy which forms a dense oxide layer of less electrical conductivity than the substrate alloy when exposed to oxidising conditions at elevated temperature, wherein said metal substrate has a layer of Ni—Sn alloy overlying and in electrical contact with an electrically conductive surface of the alloy substrate and at least one layer of Ag or of Ag containing Sn overlying and in electrical contact with the Ni—Sn alloy layer.

2. The electrically conductive component according to claim 1 wherein the Ni—Sn alloy layer overlies only part of the substrate surface.

3. The electrically conductive component according to claim 1 wherein the at least one layer of Ag overlies only part of the Ni—Sn alloy layer.

4. The electrically conductive component according to claim 1 wherein the electrically conductive metal substrate is selected from the group consisting of heat resisting nickel alloys, heat resisting copper alloys, and heat resistant steels.

5. The electrically conductive component according to claim 1 wherein an electrically conductive surface layer is provided on the surface of the metal substrate, underlying the layer of Ni—Sn alloy.

6. The electrically conductive component according to claim 1 wherein the layer of Ni—Sn alloy does not have a Sn content greater than $Ni_3Sn_2$.

7. The electrically conductive component according to claim 6 wherein the Ni—Sn alloy is one or more selected from the group consisting of a mixture of $Ni_3Sn_2$ and $Ni_3Sn$, $Ni_3Sn$, a mixture of $Ni_3Sn$ and a solid solution of Sn in Ni, and a solid solution of Sn in Ni.

8. The electrically conductive component according to claim 7 wherein the layer of Ni—Sn alloy comprises a sub-layer of a solid solution of Sn in Ni overlaid by a sub-layer of $Ni_3Sn$.

9. The electrically conductive component according to claim 1 wherein the layer of Ni—Sn alloy has a thickness in the range of about 10 to 40 μm.

10. The electrically conductive component according to claim 1 wherein the at least one layer of Ag or of Ag containing Sn has a thickness in the range of about 10 to 100 μm, preferably about 20 to 50 μm.

11. The electrically conductive component according to claim 1 wherein the at least one layer of Ag contains about 3–30 wt. % Sn.

12. The electrically conductive component according to claim 1 wherein the at least one layer of Ag contains at least about 6 wt. % Sn.

13. The electrically conductive component according to claim 1 wherein a layer of $SnO_2$ overlies the at least one layer of Ag or of Ag containing Sn.

14. The electrically conductive component according to claim 13 wherein the layer of $SnO_2$ overlies only part of the at least one layer of Ag or of Ag containing Sn.

15. The electrically conductive component according to claim 13 wherein the layer of $SnO_2$ has a thickness in the range of about 2 to 20 μm.

16. The electrically conductive component according to claim 13 wherein the $SnO_2$ layer is doped to improve the electrical conductivity of the $SnO_2$.

17. The electrically conductive component according to claim 16 wherein the dopant is one or more selected from the group consisting of $Sb_2O_5$, $Sb_2O_4$, $As_2O_3$, $P_2O_5$, F and Cl.

18. The electrically conductive component according to claim 1 which is a separator plate for solid oxide fuel cell stack.

19. A method of improving the electrical conductivity at temperatures in excess of 700° C. of a component of a solid oxide fuel cell assembly, which component comprises an electrically conductive metal substrate of heat resisting alloy which forms dense surface oxide layer of less electrical conductivity than the metal substrate in oxidising conditions at elevated temperatures, the method comprising forming a layer of Ni—Sn alloy on and in electrical contact with at least a portion of a surface of the substrate which does not have said surface oxide layer, and forming at least one layer of Ag or of Ag containing Sn on and in electrical contact with at least a portion of the Ni—Sn alloy layer.

20. The method according to claim 19 wherein the electrically conductive metal substrate is selected from the group consisting of heat resisting nickel alloys, heat resisting copper alloys, and heat resistant steels.

21. The method according to claim 19 wherein the or each Ni—Sn alloy of the layer of Ni—Sn alloy does not have a Sn content greater than $Ni_3Sn_2$.

22. A The method according to claim 21 wherein the Ni—Sn alloy is selected from one or more of the group consisting of a mixture of $Ni_3Sn_2$ and $Ni_3Sn$, $Ni_3Sn$, a mixture of $Ni_3Sn$ an a solid solution of Sn in Ni, and a solid solution of Sn in Ni.

23. A The method according to claim 19 wherein the Ni—Sn alloy layer is formed by applying the Ni—Sn alloy to the substrate by a process selected from the group consisting of electroplating, hot dipping in molten alloy, application as a slurry and drying, thermally spraying the alloy as powder, and thermally spraying mixtures of Ni and Sn powders.

24. The method according to claim 19 wherein the Ni—Sn alloy layer is formed by applying Sn to one or more layers of Ni and diffusing the Sn into the Ni layer or layers at elevated temperature.

25. The method according to claim 24 wherein the Ni layer or a first Ni layer is an at least Ni-rich surface of the substrate.

26. The method according to claim 24 wherein the Ni is doped with Li.

27. The method according to claim 24 wherein said step of forming at least one layer of Ag or of Ag containing Sn on at least a portion of the Ni—Sn alloy layer is performed by applying at least some of the Sn to the layer or layers of Ni in admixture or alloyed with the Ag and performing said diffusion step.

28. The method according to claim 24 wherein the Sn is diffused from the at least one layer of Ag containing Sn into the at least one layer of Ni at a temperature in the range of about 750° C. to 1000 C.

29. The method according to claim 27 wherein there is up to about 90 wt. % Sn, preferably up t about 45 wt. % Sn, in admixture or alloyed with the Ag.

30. The method according to claim 27 wherein plural layers of Sn in admixture or alloyed with Ag are applied, containing different proportions of Sn.

31. The method according to claim 30 wherein a respective diffusion step is performed following the application of each layer of Sn in admixture or alloyed with Ag.

32. The method according to claim 19 which additionally comprises forming a layer of $SnO_2$ on the at least one layer of Ag or of Ag containing Sn.

33. The method according to claim 32 wherein the layer of $SnO_2$ is formed by providing an excess of Sn during the formation of the Ni—Sn alloy layer, causing at least some of the excess Sn to migrate to an outer surface defined by the at least one layer of Ag or of Ag containing Sn and oxidising the Sn at said outer surface.

34. The method according to claim 33 wherein the at least one layer of Ag containing Sn contains in excess of 6 wt. % Sn and said Sn for the layer of $SnO_2$ is derived from the at least one layer of Ag containing Sn.

35. The method according to claim 32 which comprises doping the layer of $SnO_2$ to improve its electrical conductivity.

36. The method according to claim 34 which comprises prior to said layer of $SnO_2$ being formed, including a dopant in the at least one layer of Ag containing Sn for improving the electrical conductivity of the layer of $SnO_2$.

* * * * *